United States Patent
Murawski et al.

[15] 3,662,667

[45] May 16, 1972

[54] FRAME ARRANGEMENT FOR ELECTRONIC DEVICES

[72] Inventors: Kurt Murawski; Anton Schmucker; Bernd Sensburg; Josef Lanzendorfer, all of Munich, Germany

[73] Assignee: Siemens Aktiengesellschaft, Berlin, Germany

[22] Filed: July 24, 1970

[21] Appl. No.: 57,927

[30] Foreign Application Priority Data

Aug. 13, 1969 Germany ........................P 19 41 276.1

[52] U.S. Cl. ..................................98/40 R, 62/414, 62/418, 174/15, 317/100

[51] Int. Cl. ........................................H02b 1/00, F25d 17/04

[58] Field of Search .................317/100; 174/15, 16; 62/414, 62/418; 98/40 R

[56] References Cited

UNITED STATES PATENTS

| | | | |
|---|---|---|---|
| 3,147,403 | 9/1964 | Cressman et al | 317/100 |
| 3,298,195 | 1/1967 | Raskhodoff | 62/414 |
| 3,147,404 | 9/1964 | Sinner | 339/17 LM |

*Primary Examiner*—Milton Kaufman
*Assistant Examiner*—P. D. Ferguson
*Attorney*—Birch, Swindler, McKie & Beckett

[57] ABSTRACT

A frame arrangement for supporting electronic devices is disclosed in which groups of components are supported in vertical holding frames. These frames are fixedly attached or swivel-mounted about a vertical axis in a cabinet. Cooling air can be introduced through hollow spars integral with the holding frames.

3 Claims, 10 Drawing Figures

FRAME ARRANGEMENT FOR ELECTRONIC DEVICES

BACKGROUND OF THE INVENTION

The invention concerns a frame arrangement for electronic devices, for example for calculating systems, switching centers, and the like, wherein the component groups are supported in vertical holding frames which are arranged fixedly or swivel mounted around a vertical axis on a socket and/or in a cabinet-like casing.

There has already been suggested a frame arrangement wherein three rows of holding frames are affixed in series on a bottom part. In each case the one in the middle of three holding frames arranged in series is permanently connected with the socket, while the two outer holding frames are swivel mounted outwardly in the manner of a door. The holding frames contain the component groups, for example arranged in insert carriers. After letting down the two outer holding frames, the component groups of the inner holding frame are accessible.

With the progressive miniaturization of components, considerably more heat-generating electric components are housed in the same unit of volume, so that the present measures to remove heat through natural convection are no longer sufficient. It is also known already to quickly circulate, by means of blowing means, the cool air, necessarily accelerated within frameworks which often are enclosed by sheet metal casings. In the known arrangements, however, the temperature distribution was often uneven and the cost high.

The object of the invention is to provide an inexpensive frame arrangement wherein the heat removal is considerably more intensive than in heretofore known arrangements and wherein at the same time the temperature distribution within the framework in particular, the sheet metal casing enclosing the framework, can be kept even. Further, the invention is to provide a more simple cable structure, considering short cable lengths, and to provide a structure whereby assembling in the manufacture and in the building of the framework at its place of use are to be simplified. Additionally, the invention seeks to provide a two dimensional mounting arrangement capable of accommodating a greater number of holding frames while maintaining the even cooling discussed hereinabove.

SUMMARY OF THE INVENTION

To meet the above and other objects it is provided according to the invention that the holding frames possess spars of hollow profiles into which cool air can be introduced and which are provided with openings through which the cool air is conveyed to the component to be cooled. Suitably the holding frames are fixedly or rotatably connected with a bottom part, which contains air channels emanating from a cool air source, which (channels) are in connection with the interior of the spars of the holding frames. Advantageously the bottom part serving as socket consists of a lattice which contains hollow profiles extending in the direction of longitudinal arrangement of a plurality of holding frames, into which cool air is introduced, and which are connected by openings with the interior of the spars of the holding frames.

According to a working example of the invention, holding frames are provided swivel mounted around a vertical axis which are turnable around a connecting pipe as joint pin at the bottom part, through which the cool air is conveyed into the holding frame.

According to further developments of the invention air distribution pipes with a plurality of openings are provided at the holding frames, through which the cool air is distributed within the component groups. Suitably several holding frames are arranged on a common bottom part, for example in such a manner that two or more holding frames in each case are arranged in parallel with several of such parallel groups being arranged in series on the same bottom part, and at least the outer holding frames are swivel mounted.

According to a working example of the invention a cable grate is arranged above the holding frames which at the same time serves for the connection of the holding frames among each other and can contain the upper joints of the swivel mounted holding frames. The arrangement of the component groups in the holding frames per se can, for example, be such that a larger number of component groups is combined into a ventilation (cooling) unit, which is separated from the remaining component groups by a kind of casing, and wherein the cool air is distributed. Such a ventilation (cooling) unit contains, for example, in its upper side openings for the exit of the heated cool air in such a way that it is conducted past the ventilation units in each case arranged thereabove, on the outside, while the fresh cool air is introduced on the side and/or from below through air distribution pipes into the ventilation unit. Between the ventilation units horizontal cable conducting grates can be provided.

BRIEF DESCRIPTION OF THE DRAWINGS

The invention is explained in the following, as an example, with the aid of the drawings.

DETAILED DESCRIPTION OF THE DRAWINGS

Figure 1:
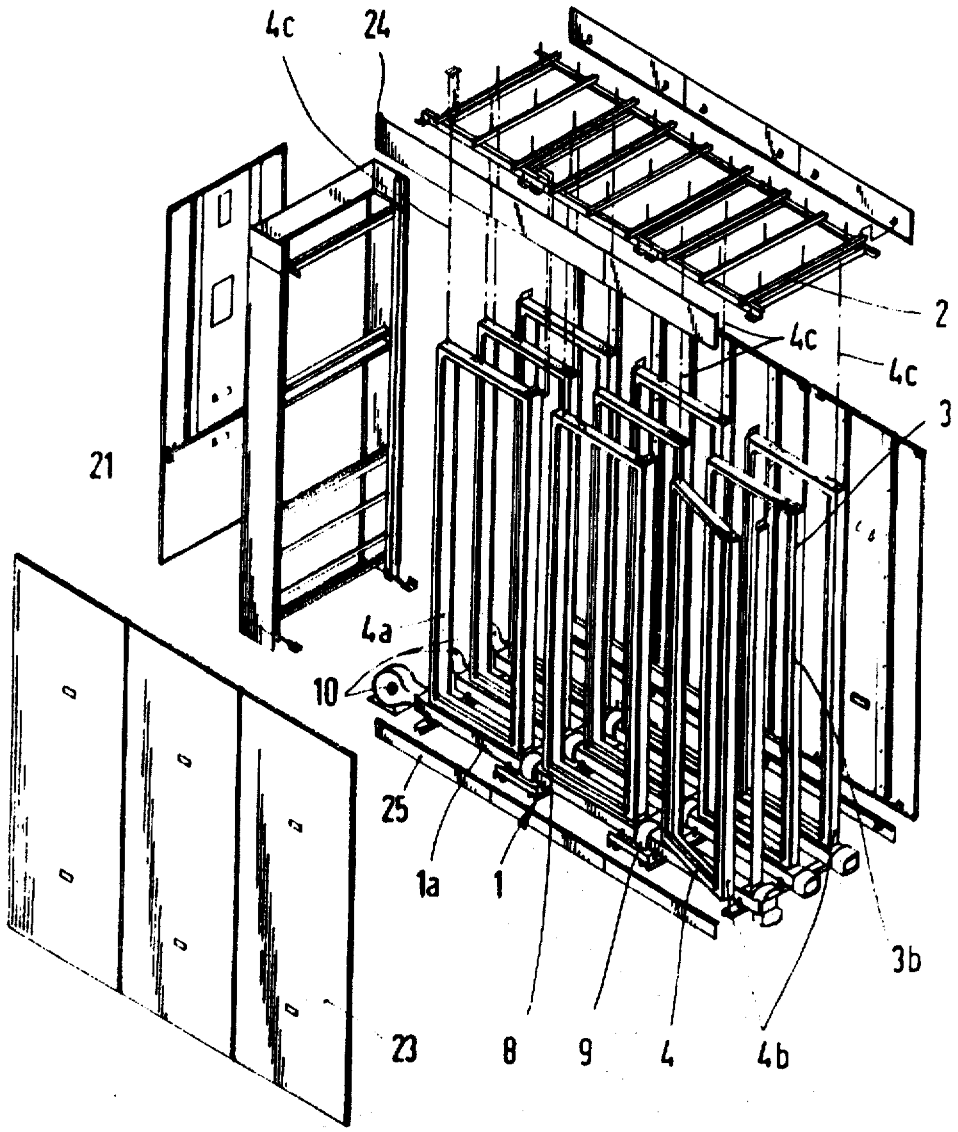
FIG. 1 shows as working example of the invention the frame arrangement as so-called explosion drawing.

In FIG. 1 the bottom part of the framework serving as a base is designated by 1; it consists of a lattice structure with hollow profiles 1a, to which blowing means 10 are connected in such a way that in each case one is connected to each longitudinally proceeding hollow profile 1*a*. As is especially evident from FIG. 3 and FIG. 4, for a framework with three rows of holding frames 3, 4 in series, three blowing means 10 are provided which in each case are connected to a hollow profile 1*a*, proceeding below frames 3 and 4 in longitudinal manner. Instead of blowing means 10 however, other cool air sources can be used; for example the connection to a compressed air network is possible.

Figure 1A:
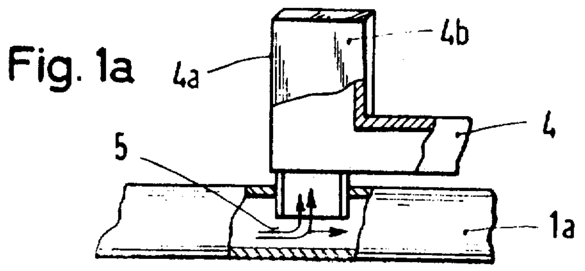
FIG. 1*a* is a detail view of FIG. 1 and FIGS. 2 – 7 illustrate the conducting of the air and the cable shifting within a framework according to the invention.

In the case of the preferred working examples shown in the drawings in each case three holding frames are arranged in series on bottom part 1. Thereby the outer holding frames, swivel mounted outwardly, are designated by 4, the inner, fixed holding frames by 3. The latter support, as shown in FIG. 1, a grate-like lattice 2 which serves for the placing of cables, and in addition is used as an additional supporting member for the entire frame structure. The outer holding frames 4 are in each case turnable around axes 4*c*; thereby according to FIG. 1*a* in the lower part of frames 4 the pivot joint is developed as pipe 5, so that the cool air blown by blowing means 10 into the hollow profiles 1a is conducted on in the vertical spars 4*a* of frames 4.

Figure 3:
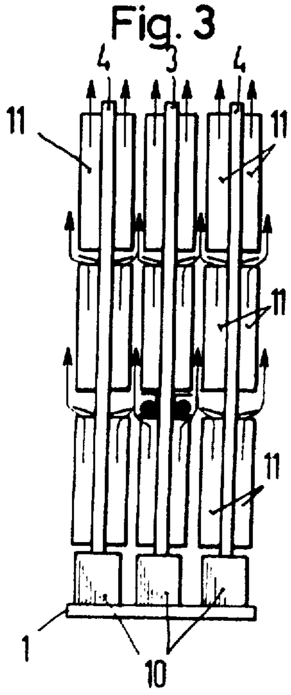
Figure 4:
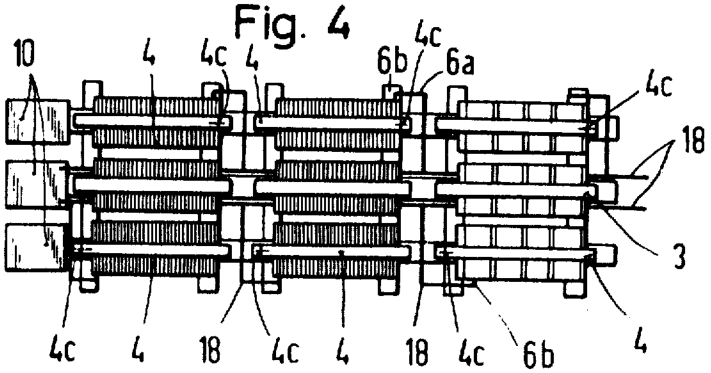

As can be seen from FIGS. 2 to 4, component groups being cooled within holding frames 3 and 4 are combined into ventilation units 11, which by themselves are ventilated through distribution pipes 12, and the air exit places of which are arranged below the deflecting plates 13 in such a way that the air is conveyed past the ventilation units 11 in each case lying thereabove, on the outside, as is evident from FIG. 3.

Hollow profiles 1*a* of socket part 1 are — as is shown in FIG. 1—airtightly connected among each other by rubber flaps 9 so that a blowing means 10 can produce the necessary cool air for an entire row of frames. The length of the frame structures is then only limited by the efficiency of the blowing means 10 that are used.

The ventilation itself, as shown by FIG. 2, FIG. 3 and FIG. 6, or 6*a*, is possible in vertical manner, i.e. the cool air is introduced through the hollow spars 4*a* and 3*a* of frames 4 and 3 and enters into the ventilation units 11 from below through a pipe 12 provided with openings. In ventilation units 11 the conducting plates or other plate-type parts carrying components, are essentially arranged vertically. The heated cool air then exits at the upper side of the ventilation units 11, as can be recognized from FIG. 3 and FIG. 6*a*.

Figure 2:
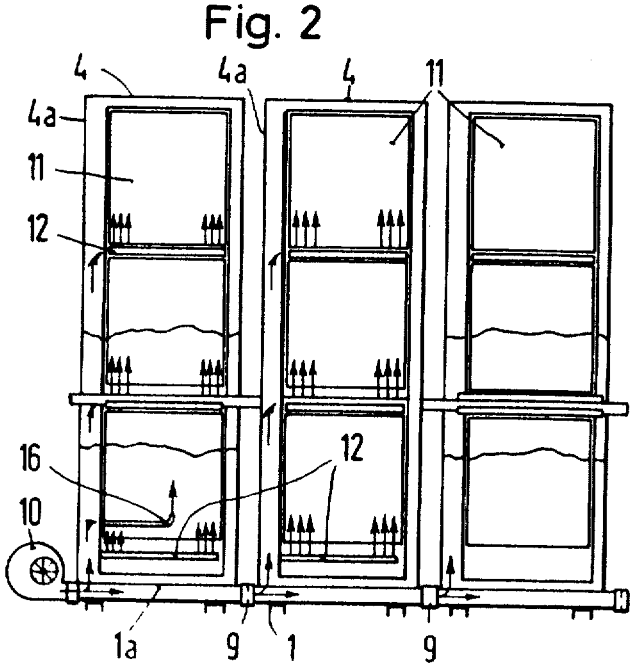
Figure 6:
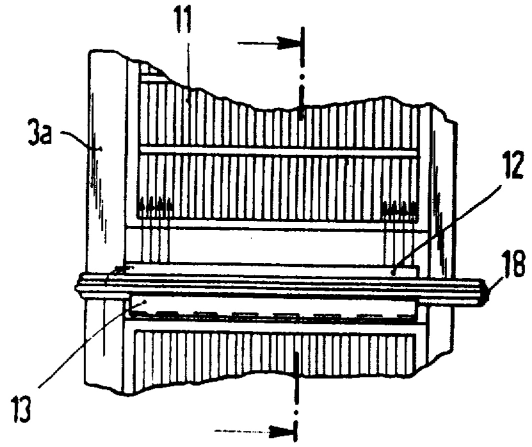
Figure 6A:
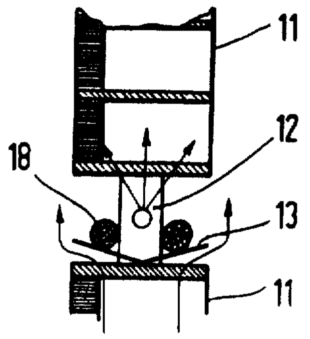

For the ventilation of components to be cooled to an especially high degree, in addition to distribution pipes 12, special air conducting pipes 16, as shown in FIG. 2, can be connected to spars 4*a*. On both sides of the air conveying pipe 12, on a plate 13 as shown in FIG. 6*a*, the cables 18 can be conducted. Plate 13 serves at the same time to re-direct the flow of heated cooling air to the exterior of ventilation units 11 lying in each case thereabove.

Figure 5:
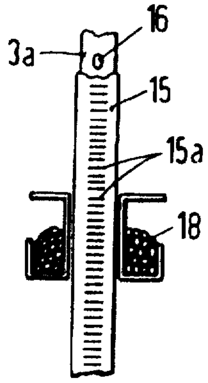
Figure 7:
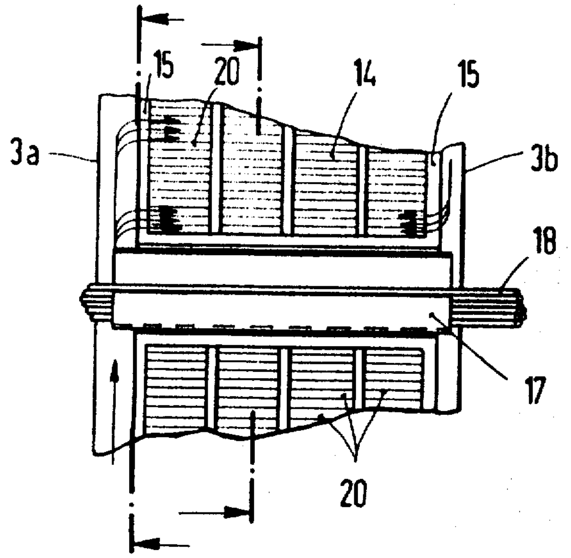
Figure 7A:
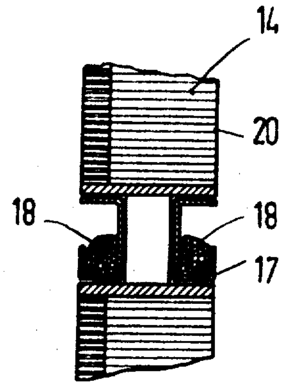

A different type of conveying of cool air is shown in FIGS. 5, 7 and 7*a*. Here the cool air is again conveyed in the spars, 4*a* and 3*a*, of frames 4 and 3, however spars 4*a* and 3*a* contain on the inner side (provided with openings 16) a vertically proceeding air distribution diaphragm 15 which, at the same time, can also form the walls of the spar. This possesses small exit slits 15*a* through which the cool air is distributed horizontally between the horizontally arranged conductor plates 20 in the cool air units 14. The used-up cool air enters into spar 3*b* on the opposite side and is let out at the upper end thereof through an opening which is not shown. This arrangement has the advantage that the influence on the cool air units 14, arranged on top in frames 3, 4, by the cool air heated by the units 14 located therebelow is still less. Between the individual ventilation units 14 there are arranged, as shown by FIG. 7*a*, in similar manner as in FIG. 6*a*, supporting means for cables 18, which in FIG. 7 and 7a are designated by 17. The three-row arrangement shown in the working examples has the advantage that nearly all parts can be utilized as carrying elements as well as at the same time for conducting of air. On the other hand it is achieved with this development that the cables between the individual component groups, or ventilating units, can be kept short, and that the heat distribution in the entire framework can be kept even, if desired, so that excessive temperatures in certain areas where components generating a high escape heat are concentrated can be avoided.

The covering parts, in FIG. 1 designated by 21 to 25, have no carrying function. Line groups 18 are suitably transferred, as shown by FIG. 4, to the fixed holding frame 3. It can be recognized that in this manner only relatively short line connections 6*a* are necessary to reach outer frame 4 which can be connected through plugs 6*b*.

As is shown by FIG. 1, a frame arrangement according to the invention can be constructed of a number of different units whereby any desired expansions are possible.

We claim:

1. In a mounting structure for apparatus requiring cooling having a plurality of holding frames in which said apparatus is mounted, said holding frames being mounted on a base, said holding frames being constructed of structural members having channels formed therein through which cooling fluid can flow, said structural members having openings therein to allow said cooling fluid to pass from said structural members through said apparatus, the improvement comprising:
   - a plurality of longitudinal members and cross members forming said base, said longitudinal members being arranged in substantially parallel rows and interconnected by said cross members,
   - said holding frames being mounted on said longitudinal members in a side-by-side relationship thereby forming a plurality of rows of holding frames, each row having a plurality of side-by-side holding frames,
   - means defining channels in said longitudinal members through which said cooling fluid flows from a source and
   - means for placing said channels in said longitudinal members in fluid communication with ones of said structural members of said holding frames adjacent to said longitudinal members.

2. The improved mounting structure defined in claim 1, wherein each of said holding frames contains a plurality of said apparatus, each said apparatus being arranged therein such that cooling fluid flows from said openings in a said structural member adjacent thereto, through the said apparatus in a predetermined direction, the improvement further comprising:
   - deflecting means arranged on said holding frames, each said deflecting means being placed at the terminal end of the cooling fluid flow through a one of said apparatus, each said deflecting means being positioned relative to the other apparatus in the holding frame associated therewith such that the cooling fluid flowing through the apparatus, at the terminal end whereof said deflecting means is placed, is deflected away from the remaining apparatus in said holding frame.

3. The improved mounting structure defined in claim 1, wherein said holding frames extend vertically from said base and are constructed of vertical structural members interconnected by horizontal structural members, the improvement further comprising:
   - means for introducing said cooling fluid into at least one of said vertical members in each said holding frame from said longitudinal base members,
   - each said apparatus being arranged for horizontal cooling fluid flow therethrough,
   - the others of said vertical members in said holding frames being placed at the terminal ends of the fluid flow through said apparatus, said other vertical members having means therein defining openings for receiving said cooling fluid.

* * * * *